US012449000B2

(12) United States Patent
Albers et al.

(10) Patent No.: US 12,449,000 B2
(45) Date of Patent: Oct. 21, 2025

(54) COMPACT ACTUATED SHEAR PIN

(71) Applicant: Caterpillar Inc., Peoria, IL (US)

(72) Inventors: Riley A. Albers, Sugar Grove, IL (US); David M. Worth, Naperville, IL (US)

(73) Assignee: Caterpillar Inc., Peoria, IL (US)

(*) Notice: Subject to any disclaimer, the term of this patent is extended or adjusted under 35 U.S.C. 154(b) by 940 days.

(21) Appl. No.: 17/531,493

(22) Filed: Nov. 19, 2021

(65) Prior Publication Data

US 2023/0160419 A1 May 25, 2023

(51) Int. Cl.
*F16C 11/10* (2006.01)
*E02F 3/38* (2006.01)
*E02F 9/00* (2006.01)

(52) U.S. Cl.
CPC .............. *F16C 11/10* (2013.01); *E02F 3/388* (2013.01); *E02F 9/006* (2013.01); *F16C 2350/26* (2013.01)

(58) Field of Classification Search
CPC . F16C 11/10; E02F 3/40; E02F 3/3668; E02F 3/3636; E02F 3/3663; E02F 3/38; E02F 3/388; E02F 9/00; E02F 9/006
See application file for complete search history.

(56) References Cited

U.S. PATENT DOCUMENTS

| | | | | |
|---|---|---|---|---|
| 5,125,788 A * | 6/1992 | Stenger | E02F 3/3631 92/28 |
| 6,231,296 B1 * | 5/2001 | Blomgren | E02F 3/3663 403/324 |
| 6,513,268 B2 * | 2/2003 | Lee | E02F 3/3636 37/468 |
| 7,963,716 B2 | 6/2011 | Yamasaki | |
| 9,062,435 B2 * | 6/2015 | Hylen | B66C 23/90 |
| 10,106,949 B2 * | 10/2018 | van Amelsfoort | E02F 3/3622 |
| 10,267,014 B2 * | 4/2019 | Lanzl | E02F 3/3636 |
| 10,323,380 B2 | 6/2019 | Sasaoka et al. | |
| 10,995,470 B2 | 5/2021 | Vail et al. | |
| 2009/0127218 A1 * | 5/2009 | Hylen | E02F 9/24 212/292 |

FOREIGN PATENT DOCUMENTS

| | | |
|---|---|---|
| JP | 2004076325 A | 3/2004 |
| JP | 2005133507 A | 5/2005 |
| JP | 2013067967 A | 4/2013 |
| JP | 3159451 A1 | 4/2017 |

* cited by examiner

*Primary Examiner* — Daniel J Wiley

(57) ABSTRACT

An actuated shear pin includes an actuator and pin body coupled to the actuator. The actuator selectively configures the pin body in a locking configuration or a stowed configuration. In the locking configuration, the pin body is placed in a travel path of two components configured to move relative to each other, to inhibit such relative movement. In the stowed configuration, the pin body is out of the travel path, thereby allowing the two components to move relative to each other.

20 Claims, 6 Drawing Sheets

COMPACT ACTUATED SHEAR PIN

TECHNICAL FIELD

This disclosure relates generally to industrial machines, and, more specifically, to an actuated shear pin for selectively inhibiting relative movement of portions of the industrial machine.

BACKGROUND

Industrial machines, such as earth moving machines, construction machines, mining machines, or the like, can include movable work implements. For instance, a wheel loader can include a bucket disposed at a distal end of a lift arm. The lift arm is movable relative to a frame of the wheel loader, e.g., to lift and lower the bucket, and the bucket can be pivoted, e.g., to receive or dump a payload during material loading and transferring operations.

For desired operational performance, regular servicing or maintenance of industrial machines is performed. For inspection or maintenance of the lift arm and/or components associated with the lift arm, e.g., actuators, fluid transfer lines, of the like, the lift arm is generally maintained in a raised position. For instance, an operator may hold a lever in a position that actuates the lift arm to, and retains the lift arm in, the raised position. However, the lift arm may be brought down if one or more actuators malfunction, or if a person unwittingly moves the lever during inspection/maintenance. Some conventional maintenance routines include using an additional machine, such as a crane or service truck to retain the lift arm in the raised position. However, some wheel loaders are used in underground applications, were the use of additional machines is not practical or desired.

U.S. Pat. No. 10,995,470 describes an improvement to manually retaining a lift arm in a raised position. Specifically, the '470 patent relates to a service pin assembly for a machine that includes a service pin and a tray for retaining the service pin. The tray of the '470 patent can be manually moved between a first position that facilitates storage of the service pin with the machine and a second position that facilitates an engagement of the service pin with a lift arm of the machine and a frame of the machine to restrict relative movement therebetween.

While the '470 patent describes an improvement to conventional systems that required manual retention of a lever in an actuated position, the '470 patent requires a mechanic, operator or other individual to physically access the service pin and tray, e.g., by climbing onto the machine or approaching the location of the pin via a boom lift or the like. Physically accessing the pin can expose the individual to moving parts of the machine, which can be hazardous.

Example implementations of the present disclosure are directed toward overcoming the deficiencies described above. For instance, aspects of the present disclosure are directed to improved shear pin designs and methods of using shear pins to facilitate relative locking of components on industrial machines.

SUMMARY

In an aspect of the present disclosure, an example electric rope shovel includes a machine comprising: a frame; a lift arm coupled to the frame and movable relative to the frame; and an actuated pin assembly actuatable between a stowed configuration and a locking configuration, the actuated pin assembly including a stationary member; a movable member coupled to and movable relative to the stationary member; and a pin body coupled to the movable member and movable with the movable member relative to the fixed member, the pin body including (i) an interior surface at least partially defining an axial bore that, with the actuated pin assembly in the stowed configuration, surrounds at least a portion of the fixed member and (ii) an exterior surface that, with the actuated pin assembly in the locking position, contacts at least one of the lift arm or the frame to inhibit movement of the lift arm relative to the frame.

In another aspect of this disclosure, an example actuated pin assembly includes: an actuator comprising a movable member and a fixed member, the movable member being movable relative to the fixed member between a retracted position and an extended position; and a pin body coupled to the movable member to move with the movable member relative to the fixed member, the pin body including an interior surface at least partially defining an axial bore that, with the actuator in the retracted position, at least partially surrounds the fixed member of the actuator.

In yet another aspect of this disclosure, an example actuated pin assembly includes: an actuator comprising a movable member and a fixed member, the movable member being movable relative to the fixed member between a retracted position and an extended position; a pin body coupled to the movable member to move with the movable member relative to the fixed member, the pin body including an interior surface at least partially defining an axial bore; and a resilient member coupled to the movable member and contacting the interior surface of the pin body.

DETAILED DESCRIPTION

This disclosure generally relates to industrial machines, such as wheel loaders, with movable implements. The improvements and techniques described herein can result in improved safety for workers tasked with maintaining and/or servicing such machines. Moreover, although the present disclosure is described in connection with industrial machines, the systems and techniques described herein may be useful in other implementations in which it is desirable to impede relative motion of mechanical components. Wherever possible throughout this disclosure, the same reference numbers will be used through the drawings to refer to the same or like features.

Figure 1:
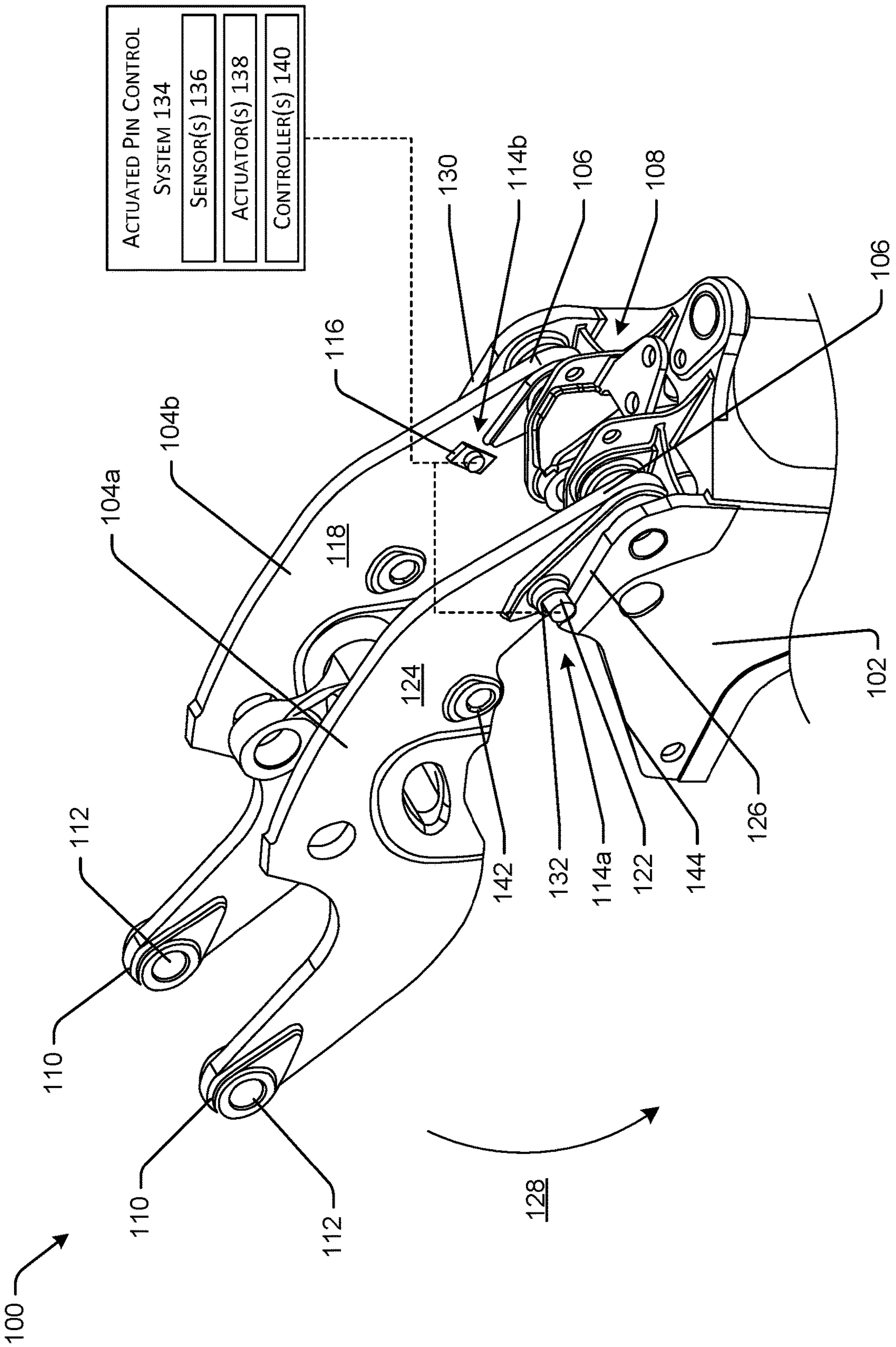
FIG. 1 is a perspective view of a portion of an industrial machine including an actuated pin assembly, in accordance with an example of the present disclosure.

FIG. 1 illustrates a lift arm assembly 100 for use with an industrial machine. The industrial machine may be configured to perform work associated with a particular industry, e.g., underground mining, open pit mining, construction, excavation, or the like. Without limitation, the industrial machine may be an excavator, an underground mining loader, a load haul dump loader, a wheel loader, a skid steer loader, or any other machine having a lift arm assembly.

More specifically, the lift arm assembly 100 includes a frame 102, a first lift arm 104*a* and a second lift arm 104*b* (collectively, the lift arms 104) coupled to, and movable relative to, the frame 102. For clarity, only a portion of the frame 102 is illustrated. However, in examples, the frame 102 may support traction devices (e.g., wheels, tracks, or the like), one or more power sources (e.g., a hydrostatic drive, an engine, or the like), a cabin for housing an operator, and/or other features. In still further examples, the frame 102 shown in FIG. 1 may be a portion of a larger frame assembly that supports some or all of the features just described and/or other features. For instance, the frame 102 may include a number of plates, beams, weldments, or other components forming a rigid frame.

The lift arms 104 are coupled to the frame 102 and are configured to rotate relative to the frame 102, as noted above. More specifically, first ends 106 of the lift arms 104 are disposed to couple to the frame 102, e.g., at a pivot 108. The lift arms 104 move about the pivot 108 relative to the frame 102. The pivot 108 may be embodied as one or more pins, latches, and/or any other coupling that facilitates pivoting of the lift arms 104 relative to the frame 102. Second or distal ends 110 of the lift arms 104 are configured for attachment of a work implement, e.g., a bucket (not shown). For instance, in the example of FIG. 1, the distal ends 110 of the lift arms 104 are illustrated as including holes 112, which may be sized and positioned to accept a pin, latch, or other feature that secures the work implement, as is generally known in the art. Although two lift arms 104 are illustrated, more or fewer lift arms (e.g., a single lift arm) may be provided. Moreover, the shape, size, and other attributes of the lift arms 104 are for example only.

Although omitted from FIG. 1 for clarity, the lift arm assembly 100 may also include additional components, including but not limited to one or more lift arm actuators. Such lift arm actuators may operatively couple the lift arms 104 to the frame 102. As in conventional applications, the lift arm actuators may be extended or retracted to raise or lower the lift arms 104, e.g., relative to the frame 102. The lift arm assembly 100 may also include one or more implement actuators, e.g., to manipulate a bucket or other implement coupled to the lift arms 104. In examples, the lift arm actuator(s) and/or the implement actuator(s) may be hydraulic, electrostatic, electromagnetic, compressed air, or any type of actuator. Also in examples, the lift arm actuator(s) and/or the implement actuator(s) may be controlled autonomously, remotely, by an operator, e.g., via an operator interface associated with the machine, or otherwise.

As also illustrated in FIG. 1, the lift arm assembly 100 includes a first actuated pin assembly 114*a* and a second actuated pin assembly 114*b* (collectively, the actuated pin assemblies 114). The first actuated pin assembly 114*a* is associated with the first lift arm 104*a* and the second actuated pin assembly 114*b* is associated with the second lift arm 104*b*. As discussed further herein, the pin assemblies 114 are configured to selectively impede motion of the lift arms 104 relative to the frame 102. More specifically, as illustrated in the example of FIG. 1, the second actuated pin assembly 114*b* is mounted, via a mount 116, to an inboard surface 118 of the second lift arm 104*b*. Although not visible in FIG. 1, the first actuated pin assembly 114*a* may be similarly mounted to an inboard surface (e.g., facing the inboard surface 118 of the second lift arm 104*b*) of the first lift arm 104*a* via a mount like the mount 116. The mount 116 is depicted schematically, and may include any features or components that facilitate mounting of the second actuated pin assembly 114*b* to the second lift arm 104*b*. Without limitation, the mount 116 may be bolted or welded to the second lift arm 104*b*, and the second actuated pin assembly 114*b* may be coupled to the mount 116 using bolts, welding, or other conventional fasteners or fastening mechanisms.

The actuated pin assemblies 114 are secured to the lift arms 104, respectively, at a position to selectively inhibit movement of the lift arms 104 relative to the frame 102. More specifically, and as detailed further below with reference to FIGS. 2A-4, the actuated pin assemblies 114 are configured to selectively actuate between a stowed configuration and a locking configuration. Specifically, in the stowed configuration, the actuated pin assemblies 114 are disposed so as to not impede movement of the respective lift arms 104, relative to the frame 102. In contrast, in the locking configuration, a portion of the actuated pin assemblies 114 is disposed to prevent some movement of the respective lift arms 104 relative to the frame 102.

In the example of FIG. 1, the first actuated pin assembly 114*a* is configured in the locking configuration. In this configuration, a pin body 122 of the first actuated pin assembly 114*a* extends beyond an outboard surface 124 of the first lift arm 104*a*. In this position, the pin body 122 is disposed to limit travel of the first lift arm 104*a* relative to the frame 102. Specifically, the pin body 122 is disposed to contact a surface 126 of the frame 102 to prevent movement of the first lift arm 104*a* relative to the frame 102 in a direction indicated by an arrow 128. In the example of FIG. 1, the surface 126 may include a saddle or other contoured feature that generally corresponds to an outer surface of the pin body 122. In other examples, a hole or other feature may be disposed in the frame 102, with the pin body 122 being disposed in the hole to prevent relative movement of the frame 102 and the lift arm 104*a*, as detailed herein. Although obscured in the view of FIG. 1, the second actuated pin assembly 114*b* may be similarly configured in a locking configuration, e.g., in which a pin body associated therewith extends outboard of the lift arm to contact a surface 130 (or opening or other feature) of the frame 102. In the illustrated example, the actuated pin assemblies 114, in the locking configurations, retain the lift arms 104 in a raised position.

In the stowed position (not illustrated in FIG. 1, but demonstrated in FIG. 3, discussed below), the pin body 122 is positioned so as to not contact the surface 126 of the frame 102. In the illustrated example, the pin body 122 may be retracted into an opening 132 formed through the first lift arm 104*a*. Accordingly, the first actuated pin assembly 114*a* is disposed at least partially in the opening 132 and at least a portion of the first actuated pin assembly 114*a*, e.g., at least a portion of the pin body 122, extends from the opening 132 in the locking configuration. Although obscured by the mount 116, the second lift arm 104*a* may have an opening similar to the opening 132, with portions of the second actuated pin assembly 114*b* being disposed in and/or configured to extend from the opening. Details of this arrangement are described further below, including with reference to FIGS. 3 and 4.

FIG. 1 also shows an actuated pin control system 134 associated with the lift arm assembly 100. The actuated pin control system 134 is shown schematically, and includes one or more sensors 136, one or more actuators 138, and one or more controllers 140. Generally, the actuated pin control system 134 facilitates actuation of the actuated pin assemblies 114, e.g., between the stowed and locked configurations, discussed above. Aspects of the actuated pin control system 134 may be integrated into the individual actuated pin assemblies 114 and/or may be remote from the actuated pin assemblies 114. In some examples, the actuated pin control system 134 facilitates remote actuation of the actuated pin assemblies 114, e.g., between the stowed and locking configurations. Remote actuation obviates the need for a worker or operator to physically place or adjust the pin body, thereby improving safety outcomes.

In more detail, the sensor(s) 136 may include one or more sensors associated with the lift arms 104, the frame 102, and/or the actuated pin assemblies 114. For instance, and without limitation, the sensor(s) 136 can include position and/or state sensors that sense a position or presence of the lift arms 104 relative to the frame 102. In examples, data from the sensor(s) 136 can indicate that the lift arms 104 are in a raised position or a lowered position, e.g., relative to the frame 102. In other examples, the sensor(s) 136 can include position and/or state sensors that sense a position or state of the actuated pin assemblies 114. Without limitation, data from the sensor(s) 136 can indicate whether the actuated pin assemblies 114 are in the locking configuration or in the stowed configuration. Additional examples of the sensor(s) 136 are discussed further herein.

The actuator(s) 138 are configured to selectively actuate components of the lift arm assembly 100. For instance, the actuator(s) 138 can include lift arm actuators, e.g., coupled to the frame 102 and to the lift arms 104, that cause the lift arms 104 to move relative to the frame 102, e.g., between a raised position and a lowered position. The actuator(s) 138 can also include actuators associated with the actuated pin assemblies 114, e.g., actuation of which configures the actuated pin assemblies 114 in the stowed or locking configurations. As noted above, and although not illustrated in FIG. 1, the lift arm assembly 100 can also include one or more implement actuators, e.g., to move a bucket or other implement relative to the lift arms 104.

The controller(s) 140 are configured to control aspects of the lift arm assembly 100. The controller(s) 140 may include a central processing unit, a suitable memory component, various input/output peripherals, and other components typically associated with machine controllers. The controller(s) 140 may include programs, algorithms, data maps, etc., associated with operation of the aspects of the machine. In examples, the controller(s) 140 may be configured to receive information from multiple sources, such as, for example, the sensor(s) 136, the actuator(s) 138, and/or a machine operator for instance, via a control device or user interface element. In some instances, the controller(s) 140 may include a dedicated electronic control module (ECM) or other type of onboard computer of the machine. In some embodiments, aspects of the controller(s) 140 may be integrated into the sensor(s) 136 and/or the actuator(s) 138, e.g., such that the sensor(s) 136 and/or the actuator(s) 138 may be configured to perform operations discussed herein. In this case, the controller(s) 140, or certain aspects thereof, may be eliminated.

In examples detailed further below, including below with reference to FIG. 6, the controller(s) 140 may include logic to receive a request to secure the lift arm assembly 100, e.g., a request from an operator to ready the lift arm assembly 100 for maintenance or inspection. For instance, as noted above, it may be desirable to secure or "lock" the lift arms 104 in a raised position, e.g., relative to the frame 102. The controller(s) 140 may also include functionality to receive sensor data from the sensor(s) 136. For example, the controller(s) 140 can receive sensor data from the sensor(s) 136 indicative of a position or state of the lift arms 104 and/or the actuated pin assemblies 114. Based on data from the sensor(s) 136, the controller(s) 140 can determine that the lift arms 104 are in a raised position, and thus capable of being locked out. The controller(s) 140 can also include logic to generate and/or send one or more signals to control the actuator(s) 138. For example, when the controller(s) 140 determine, from the sensor data, that the lift arms 104 are in the raised position, the controller(s) 140 may control actuators associated with the actuated pin assemblies 114 to configure the actuated pin assemblies 114 in the locking configuration. The controller(s) 140 may also include logic to determine that the actuated pin assemblies 114 are in the locked configuration, e.g., based on data from one or more of the sensor(s) 136 associated with the actuated pin assemblies 114. Additional functionality associated with the controller(s) 140 is detailed further herein.

As will be appreciated from the foregoing, the controller(s) 140 may be configured to control the actuated pin assemblies 114, e.g., remotely. As a result, the arrangement and techniques described herein can obviate the need for an operator, mechanic, or other individual to physically place a shear pin to lock out the lift arms 104. Accordingly, aspects of this disclosure provide improved safety outcomes.

The lift arm assembly 100 illustrated in FIG. 1 is for example only; modifications are contemplated. For example, although each of the lift arms 104 is illustrated in FIG. 1 as including one of the actuated pin assemblies 114, in other examples only a single instance of the actuated pin assemblies may be provided. For instance, when the first lift arm 104*a* and the second lift arm 104*b* are fixed to each other, a single instance of the actuated pin assemblies 114, e.g., only the first actuated pin assembly 114*a*, may be sufficient to retain both lift arms 104 in the raised position.

Moreover, individual of the lift arms 104 may include more than one instance of the actuated pin assemblies 114. For example, multiple instances of the actuated pin assemblies 114 may be disposed along a length of the lift arms 104, each configured to secure the lift arms 104 at a different position relative to the frame 102. With specific reference to FIG. 1, although not illustrated, an additional instance of the actuated pin assemblies 114 may be disposed to cooperate with holes 142 relatively closer to the distal end 110 of the first lift arm 104*a*. In this example, the additional instance of the actuated pin assemblies may include a pin body that contacts an additional surface 144 of the frame 102. As will be appreciated, this example contact will retain the first lift arm 104*a* in a different position, relative to the frame 102, than that illustrated.

Moreover, although the actuated pin assemblies 114 are illustrated as being secured to the lift arms 104, in other examples, the actuated pin assemblies 114 may be coupled to the frame 102. In such examples, the pin body 122, in the locking configuration, may be contacted by a surface of the lift arms 104. Stated differently, in the locking configuration, the pin body 122 may be disposed in a travel path of the lift arms 104, e.g., a travel path relative to the frame 102. Moreover, although the actuated pin assemblies 114 are disposed to selectively allow/prevent movement of the lift arms 104 relative to the frame 102, other instances of the actuated pin assemblies 114 may be used to prevent other relative movement. Without limitation, the actuated pin assemblies 114 may be disposed to selectively prevent movement of an implement relative to the lift arms 104, of articulating frame portions, and/or of any two components configured to move relative to each other. As will be appreciated with the benefit of this disclosure, the features and techniques described herein may be useful to prevent relative movement of any mechanical components in many applications. Aspects of this disclosure are not limited to use with lift arms on machines.

Figure 2A:
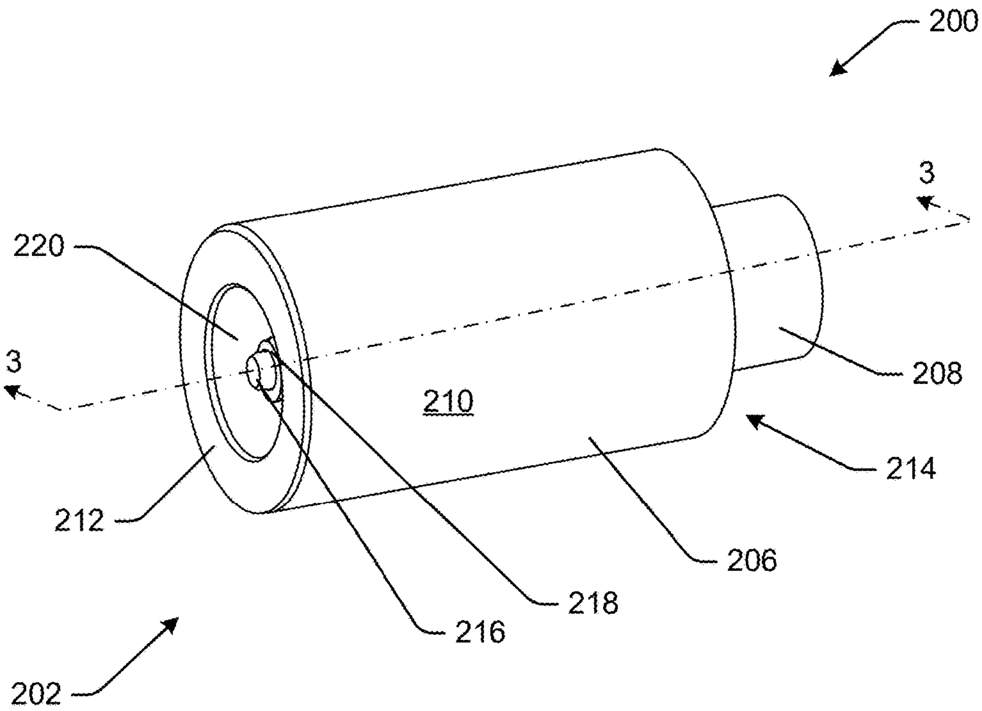
FIG. 2A includes a perspective view of an actuated pin assembly, for use with a machine, in each of a stowed configuration, and FIG. 2B includes a perspective view of an actuated pin assembly, for use with a machine, in a locking configuration, in accordance with aspects of the present disclosure.
Figure 2B:
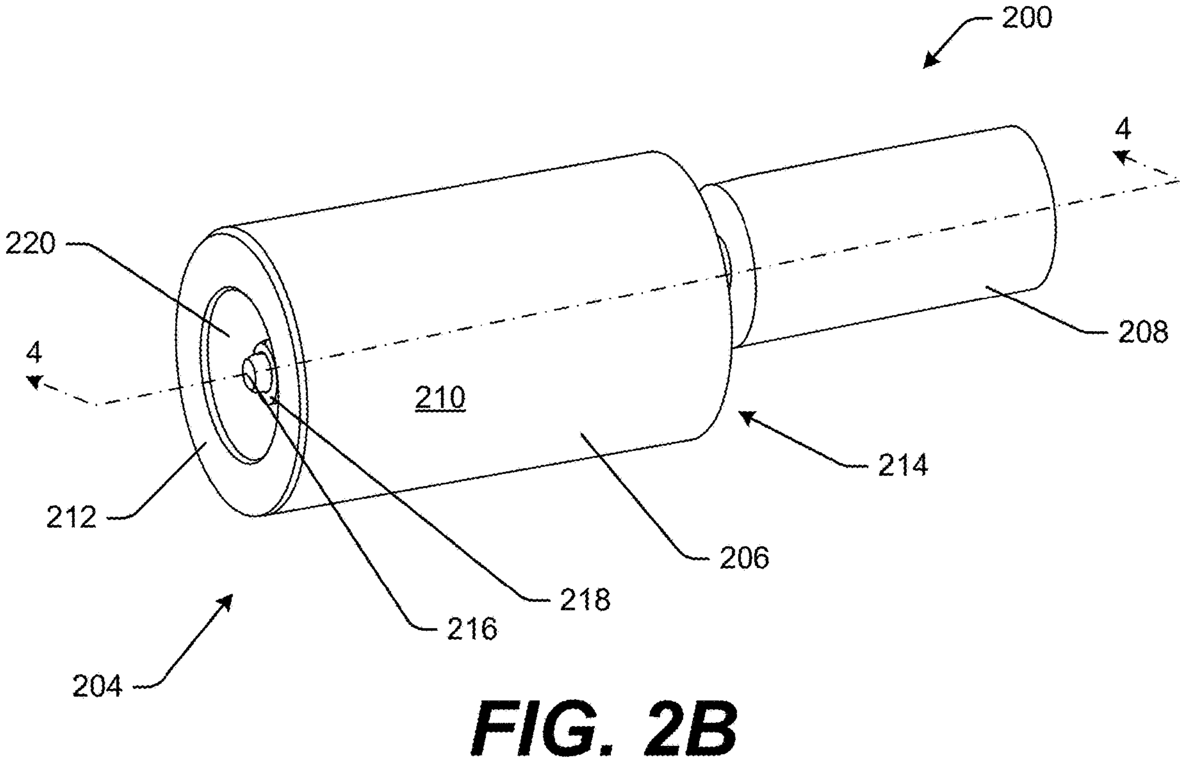

FIGS. 2A and 2B are perspective view showing an actuated pin assembly 200 in more detail. The actuated pin assembly 200 may be one of the actuated pin assemblies 114, for example. More specifically, FIG. 2A shows the actuated pin assembly 200 in a stowed configuration 202 and FIG. 2B shows the actuated pin assembly 200 in a locking configuration 204, generally corresponding to the stowed and locking configurations, respectively, discussed above in connection with FIG. 1.

As illustrated in FIGS. 2A and 2B, the actuated pin assembly 200 includes a pin body 206, which may correspond to the pin body 122. The pin body 206 is illustrated as having a generally cylindrical, exterior surface 210, e.g., a sidewall, extending between a first end 212 and an opposite, second end 214 (obscured in FIGS. 2A and 2B). Although the exterior surface 210 is cylindrical in FIGS. 2A and 2B, the exterior surface 210 may be differently shaped, e.g., depending on the application. For instance, the exterior surface 210 may have one or more flat, arcuate, or other surface contours. In some examples, a contour of the exterior surface 210 may be configured to cooperate with a surface or feature on a part to be "locked" in the locking configuration 202. However, the cylindrical sidewall 210 may be preferred in some examples, for instance, because the pin body 206 will have the same configuration regardless of a rotational orientation of the pin body 206.

Figure 3:
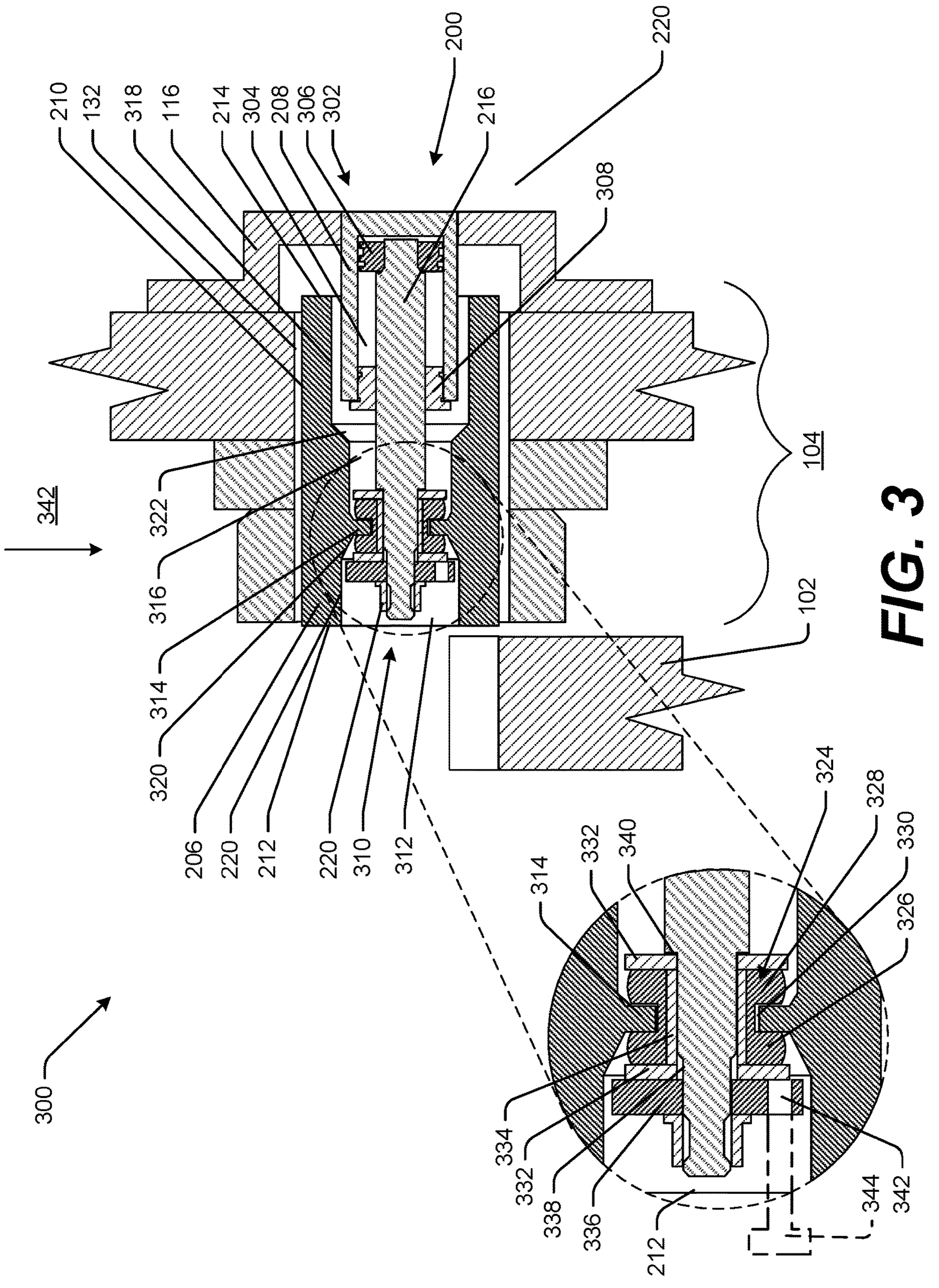
FIG. 3 is a cross-sectional view of the actuated pin assembly of FIG. 2A, taken along the section line 3-3 in FIG. 2A, in accordance with aspects of this disclosure.
Figure 4:
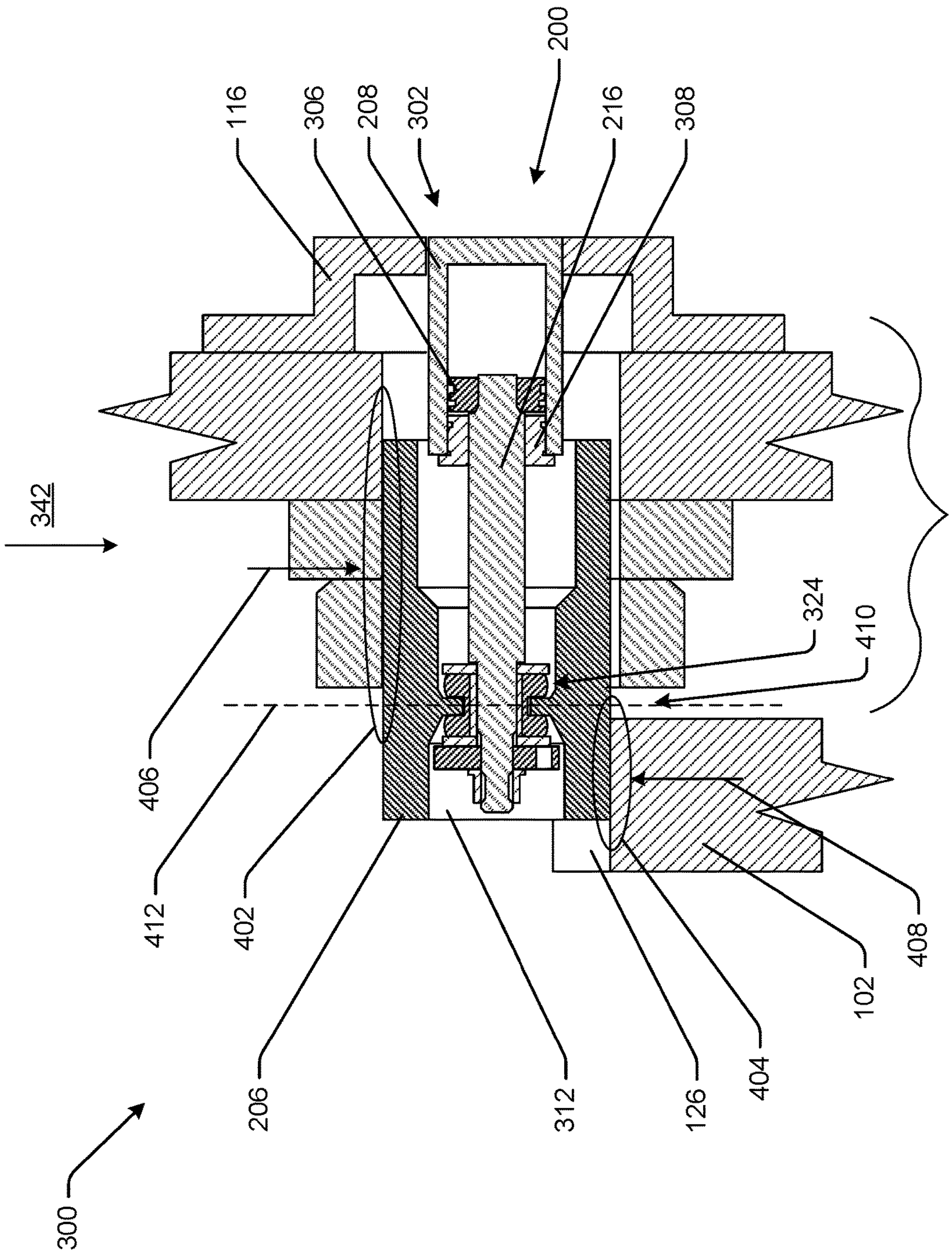
FIG. 4 is a cross-sectional view of the actuated pin assembly of FIG. 2B, taken along the section line 4-4 in FIG. 2B, in accordance with aspects of this disclosure.

In the example of FIGS. 2A and 2B, and better illustrated in FIGS. 3 and 4, the pin body 206 is coupled to a movable member, embodied as a piston rod 216. The piston rod 216 is disposed to move relative to a fixed or stationary member, embodied as a cylinder 208. More specifically, the piston rod 216 is movable relative to the cylinder 208 between a retracted position and an extended position. In the example of FIGS. 2A and 2B, a distal end of the piston rod 216 is threaded, and a nut 218 retains the pin body 206 on the piston rod 216. An axial bore 220 is formed in the first end 212 of the pin body 206, and the distal end of the piston rod 216 and the nut 218 are disposed in the first bore 220. This arrangement is detailed further in FIG. 3, although the arrangement is also for illustration only. In one alternative example, the bore 220 may not be present, e.g., the nut 218 may be secured to the first end 212 of the pin body 206. The threaded nut 218 is only one example of a retaining fastener that can be secured to the piston rod 216 to secure the pin body 206 to the piston rod 216. Other retaining fasteners may include pins, clips, collars, and/or the like.

In the stowed configuration 202, the piston rod 216 is retracted, relative to the cylinder 208. Accordingly, the pin body 206 is also in a retracted position. As detailed further below with reference to FIG. 3, in the stowed configuration 202, the pin body 206 is disposed to surround the cylinder 208, e.g., by receiving a body of the cylinder 208 in an axial bore formed in the second end 214. In the locking configuration 204, when the piston rod 216 is extended, the pin body 206 is also extended from the cylinder 208. In the stowed configuration 202, as discussed above, the pin body 206 is disposed out of the path of travel of a first component (e.g., the frame 102) that moves relative to a second component (e.g., the lift arms 104) so as to not impede such relative motion. As also discussed above, in the locking configuration 204 the pin body 206 is disposed in the path of travel, e.g., to contact a surface of the first component. This contact limits (or prevents) relative movement of the components, thereby "locking" the components in a desired position.

FIGS. 3 and 4 show the interaction of the actuated pin assembly 200 with components of a machine. More specifically, FIG. 3 is cross-sectional view 300 taken along section line 3-3 in FIG. 2A, and FIG. 4 is a cross-sectional view 400 taken along section line 4-4 in FIG. 2B. In each of FIGS. 3 and 4, additional environment for the actuated pin assembly 200, e.g., portions of the frame 102 and the lift arm 104, is shown, also in cross-section. Moreover, in FIGS. 3 and 4, the elements introduced above with reference to, and labelled in, FIGS. 2A and 2B, are referred to, and labelled, using the same reference numerals.

The cross-sectional view 300 of FIG. 3 corresponds to the stowed configuration 202. As shown, the pin body 206 is disposed in the opening 132 extending through the lift arm 104. Here, the lift arm 104 is illustrated as including three pieces, although more or fewer components could form the thickness of the lift arm 104 through which the opening 132 is formed. The pin body 206 is secured to the piston rod 216, and the piston rod 216 is disposed to move relative to the cylinder 208. FIG. 3 also shows, schematically, that the cylinder 208 is coupled to the lift arm 104 via the mount 116.

In more detail, the cylinder 208 and the piston rod 216 comprise portions of an actuator 302, which may be one of the actuator(s) 138 discussed above. In more detail, the cylinder 208 at least partially defines a volume 304. A piston 306, to which the piston rod 216 is attached, is disposed in the volume 304. A piston seal 308 seals the volume 304. As in conventional actuators, the piston 306 is configured to slide, in an axial direction, relative to an inner surface of the cylinder 208 in response to a force applied on a side of the piston. In the illustrated example, the actuator 302 is a hydraulic actuator, and hydraulic fluid is selectively forced into the volume 304 to cause actuation of the piston 306. Hydraulic fittings, supply lines, and/or the like are not shown, for clarity. Moreover, although FIGS. 3 and 4 embody the actuator 302 as a hydraulic cylinder, other actuators are contemplated. Without limitation, the actuator 302 may be a compressed air actuator, an electromechanical actuator, a drive screw, or the like.

As also shown in FIG. 3, the pin body 206 includes an axial opening 310. The axial opening 310 has a varied profile, e.g., formed by a number of different diameters, providing a contoured interior surface 312 of the pin body. For example, proximate the first end 212, the axial opening 310 defines the bore 220 discussed above, which may be a first bore. The axial opening 310 also defines a protrusion 314, an intermediate section 316, and a second bore 318 proximate the second end 214. As illustrated, the axial opening 310 also defines a first transitional section 320, between the first bore 220 and the protrusion 314, and a second transitional section 322, between the intermediate section 316 and the second bore 318. Thus, the interior surface 312 of the pin body includes, from the first end 212 of the pin body 206 to the second end 214, the bore 220, the first transitional section 320, the protrusion 314, the intermediate section 316, the second transitional section 322, and the second bore 318. Functionality and attributes of the varied sections are described in more detail, below. Moreover, the sections, shapes, and sizes of the axial opening 310 are for example only. In examples, some or all of the sections may be combined, omitted, and/or differently sized/shaped. As detailed further herein, the axial opening 310 may be configured to provide clearance between the interior surface 312 and components of the actuator 302, except at a cushioned interface.

FIG. 3 also shows additional aspects of the actuated pin assembly 200. For example, a resilient member 324 (shown more clearly in the magnified insert of FIG. 3) is disposed on the piston rod 216, e.g., proximate a distal end of the piston rod 216. The resilient member 324 cooperates with the protrusion 314 of the axial opening 310. More specifically, the resilient member 324 includes a first radial protrusion 326 spaced from a second radial protrusion 328. The first radial protrusion 326 and the second radial protrusion 328 form an annular channel 330 therebetween. As shown in FIG. 3, the resilient member 324 is disposed, in the axial direction, between washers 332. Moreover, a sleeve 334 is disposed between the piston rod 216 and the resilient member 324. In other examples, one or both of the washers 332 may be replaced by other members configured to retain the resilient member 324 in a fixed position on the piston rod 216, e.g., in the axial dimension, or one or both of the washers 332 may be omitted entirely. As described further below, the washers 332 may also apply a force in the axial direction to the resilient member, e.g., to retain the resilient member at least partially compressed in the axial direction.

The resilient member 324 may be a compressible member, e.g., made of a polymer, rubber, or the like. In some implementations, the resilient member 324 may be embodied as an isolation mount, e.g., a mushroom mount. Isolation mounts are conventionally used to accommodate displacement, damp vibration, reduce shock, or the like. In this example, the resilient member may be formed as two pieces, e.g., a first piece including the first radial protrusion 326 and a second piece including the second radial protrusion 328. Moreover, two or more of the first radial protrusion 326, the second radial protrusion 328, the washers 332 and/or the sleeve 334 may be formed as one or more integral parts. As will be appreciated, isolation mounts may have different sizes, shapes, durometer or hardness characteristics, or the like, e.g., depending on the application. In the example, the washers 332 and/or the sleeve 334 may be harder than the resilient member 324. For instance, the washers 332 and/or the sleeve 334 may be metal or other relatively rigid materials.

In still further examples, the resilient member 324 may be embodied as one or more other components that provide for non-destructive displacement of the pin body 206 relative to the piston rod 216, as described herein. As noted above, polymeric members may provide for such displacement, but other types of resilient members 324, such as springs, spaced-apart magnets, e.g., spaced in the radial direction, or the like, also are contemplated.

The actuated pin assembly 200 also includes a disc 336 arranged closer to the distal end of the piston rod 216 than the resilient member 324. Specifically, the disc 336 includes an axial opening sized to retain the outer surface of the piston rod 216, and the disc 336 is positioned between the resilient member 324 and the nut 218. In some examples, the disc 336 may be substantially cylindrical and the axial opening of the disc 336 may also be round. However, in other examples the disc 336 and/or the piston rod 216 may include anti-rotation features. In the example illustrated in FIG. 3, the piston rod 216 includes a number of flats 338 (shown more clearly in FIG. 5, discussed below) forming a non-circular profile for the piston rod 216 proximate the threaded end. The axial opening in the disc 336 has a contour to match the non-circular profile of the piston rod 216, e.g., at straight or planar segments corresponding to the flats 338. Accordingly, the flats 338 may require that the disc 336 be oriented on the piston rod 216 in one or more specific ways. Moreover, the flats 338 ensure that the disc 336 does not rotate relative to the piston rod 216. For example when the nut 218 is tightened on the piston rod 216, the disc 226 will not rotate relative to the piston rod 216, e.g., if there is friction between the nut 218 and the disc 336. Although the example of FIG. 3 includes the flats 338 on the piston rod 216 and corresponding flats on the axial opening of the disc 336, other arrangements and configurations may be used to reduce inhibit rotation of the disc 336 relative to the piston rod 216. For instance, any non-circular profiles, a keyed arrangement, or the like, may be used.

During assembly, the resilient member 324, washers 332, and the disc 336 are placed over the distal end of piston rod 216, e.g., with one of the washers 332 contacting a step 340 formed on the piston rod 216. As will be appreciated, the step 340 may be formed from a reduction in the diameter of the piston rod 216, although in other examples the step 340 may be formed via a collar or other diameter-altering structure secured to an outer surface of the piston rod 216. The step 340 provides an axial positioning of the resilient member 324 and other features just discussed. Specifically, the step 340 provides a rigid surface that inhibits further axial displacement, relative to the piston rod 216. Threading the nut 218 onto the piston rod will cause the disc 336 to move in the axial direction, thereby applying a force to compress the resilient member 324 in the axial direction, e.g., between the step 340 and the nut 218. The compression caused by tightening the nut 218 will cause the first and second radial protrusions 326, 328 to "pinch" the protrusion 314 of the axial opening 310 of the pin body 206. In the illustrated embodiment, the sleeve 334 may be sized, and sufficiently stiff, to maintain an axial distance between the washers 332 and prevent further tightening of the nut 218. In some examples, the nut 218 may be tightened to a predetermine torque, e.g., based on properties of the resilient member 324, a loading of the resilient member 324, and/or the like.

As noted above, the flats 338 or similar feature(s) may be provided to prevent relative rotation of the disc 336 to the piston rod 216 during tightening of the nut 218. However, as will be appreciated, the disc 336 and the piston rod 216 may rotate, e.g., together, during tightening of the nut 218. Accordingly, aspects of this disclosure also include a tool interface, via which rotation of the disc 336, e.g., relative to the pin body 206, may be prevented. In the example of FIG. 3, a threaded hole 342 is formed through the disc 336. The threaded hole 342 is offset from a central axis of the piston rod 216. The threaded hole 342 is configured to selectively receive a threaded bolt 344. With the threaded bolt 344 threaded into the threaded hole, a torque may be applied to the nut 218, to tighten the nut 218 as discussed above, and a tool, such as a wrench, may be coupled to a head of the threaded bolt to apply a force that counters the torque applicated to the nut 218. In this example, once the nut is sufficiently tightened, the threaded bolt 344 can be removed.

In this example, the threaded bolt 344 is sufficiently long to extend past the first end 212 of the pin body 206, e.g., for ready engagement by the tool. However, in other examples the bolt head may be disposed in the first bore 220 and may be accessed by a socket or similar tool. Similarly, the nut 218 may be tightened using a socket wrench, e.g., because the nut 218 is disposed in the first bore 220. Other tool interfaces and/or tool interface arrangements also are contemplated. For example, multiple instances of the threaded hole 342 may be formed through the disc 336, e.g., circumferentially spaced from each other. In this example, a tool may be configured to contact each of a plurality of bolts disposed in the threaded openings. Without limitation, the tool may have a plurality of surfaces configured to engage with the bolts. In other examples, instead of the threaded opening, the disc 336 can be replaced with a protrusion, e.g., that is engageable with a tool (such as a socket wrench) or with a differently-shaped opening that can receive a different tool, e.g., an Allen key or the like.

In the illustrated example, the portions of the axial opening 310 provide for coupling of the piston rod 216, e.g., via the protrusion 314 and the resilient member 324. However, at other axial positions of the pin body 206, the interior surface 312 is sized to be radially spaced from the piston rod 216 and other components associated with the piston rod 216. For example, the disc 336 is spaced from the first bore 222, the washers 332 are spaced from the first transitional section 320 and the intermediate section 316. The piston rod 216 and the cylinder 208 also are spaced from the interior surface 312. As detailed further below, minimizing contact of the pin body 206 and the piston rod 216 to the interface at the protrusion 314 and the resilient member 324 may prevent damage to both the actuator 302 and the pin body 206, e.g., by controlling how, and where, contact is made.

In the example of FIG. 3, in the stowed configuration, at least a portion of the cylinder 208 is disposed in the second bore 318. Stated differently, the pin body 206 acts as a sleeve that receives at least a portion of the cylinder therein in the stowed configuration. As noted above, the outer surface of the cylinder 208 is radially spaced from the interior surface 312 of the pin body 206, e.g., at the second bore 318. This arrangement reduces an overall length of the actuated pin assembly 200. For example, this reduced length may facilitate incorporation of the actuated pin assembly 200 into existing machines and/or work implements, such as the lift arm assembly 100 with minimal modification or clearance requirements.

In the example of FIG. 3, the mount 116 couples the cylinder 208 to the side of the lift arm 104 such that the pin body 206 is substantially entirely disposed in the opening 132. The opening 132 and the pin body 206 are sized to provide a clearance fit, e.g., such that the exterior surface 210 of the pin body 206 is spaced from the inside of the opening 132. Also in the stowed configuration shown in FIG. 3, the pin body 206 does not extend from the opening 132, e.g., in the axial direction, into a path of travel of the frame 102. More specifically, FIG. 3 also shows a portion of the frame 102, and in the illustrated configuration, the lift arm 104 is free to move relative to the frame 102, e.g., generally in the direction of an arrow 342, which corresponds in direction to the arrow 128 of FIG. 1.

FIG. 4 shows the actuated pin assembly 200 in the locking configuration. In this example, the piston rod 216 is extended, e.g., relative to the cylinder 208. More specifically, the piston 306 is moved relatively closer to the piston seal 308. In this configuration, the pin body 206 extends into the path of travel of the frame 102 (e.g., relative to the lift arm 104). As will be appreciated, the exterior surface 210 of the pin body 206 contacts the surface 126 of the frame 102 to prevent continued motion of the lift arm 104, e.g., in the direction of travel represented by the arrow 342. As noted above, although the surface 126 is shown as an upper surface or saddle associated with the frame 102, in other examples the pin body 206 may engage with an opening or hole formed in the frame 102. Use of the opening or hole may require greater positioning precision before actuating the pin body 206 to the locking configuration, but may also have the benefit of restricting substantially all relative movement of the lift arm 104 relative to the frame 102. Moreover, although the lift arm 104 is illustrated as including a hole through which the pin body 206 extends, in other examples the hole may be replaced with different openings and/or different surfaces. For example, and without limitation, the pin body 206 may be configured to contact a surface of the lift arm 104 that includes a saddle or other surface features, like the surface 126.

In the example of FIG. 4, the actuated pin assembly 200 may be subjected to large shear loads. Specifically, with the pin body 206 extended into the travel path of the frame 102 the pin body 206 will experience a first shear force at a first region 402 and a second shear force at a second region 404. The first shear force at the first region 402 results from contact of the pin body 206 with the lift arm 104 and is represented in FIG. 4 by a first arrow 406. The second shear force at the second region 404 results from contact of the pin body 206 with the frame 102 and is represented in FIG. 4 by a second arrow 408. Because the first shear force and the second shear force are in generally opposite directions and are spaced from each other, e.g., in a direction parallel to the axis of the actuated pin assembly 200, components of the actuated pin assembly 200 may be subjected to a bending or twisting resulting from the first and second shear forces. However, in examples of this disclosure, the resilient member 324 is configured to offset, e.g., absorb, these forces. For instance, the resilient member 324 may allow for movement of the pin body 206 relative to the piston rod 216 and/or other components of the actuator 302, while preventing the interior surface 312 of the pin body 206 from contacting components of the actuated pin assembly 200. Stated differently, the resilient member 324 may allow for a pliable connection between the pin body 206 and the actuator 302 that absorbs the relative displacement until the pin body 206 fully contacts the surface 126. This contact results in substantially all loads being transferred from the pin body 206 to the contact surface 126, e.g., without being transferred to the piston rod 216. Stated differently, the resilient member 324 decouples the cylinder from the pin load, by absorbing displacement caused by offsets resulting from clearance between the pin body 206 and the opening 132, mechanical tolerances, and/or the like. In some alternative examples a rigid connection may be used instead of the resilient member 324, although such a rigid connection may completely transfer loads to the piston rod 216 and/or other components of the actuated pin assembly 200. Such transfer of loads may lead to premature failure of the piston seal 308, undesirable wear of the piston 306, bending of the piston rod 216, or other problems that could prevent proper functioning of the actuated pin assembly 200.

In addition to using the resilient member 324 at the connection of the pin body 206 and the actuator 302, the inventors have found that the positioning of the resilient member 324, e.g., in the axial direction, may also provide benefits. As shown in FIG. 4, a gap 410 is disposed between the frame 102 and the lift arm 104. As will be appreciated, the gap 410 provides clearance between the frame 102 and the lift arm 104 to allow the two components to move relative to each other, as discussed herein. In the locking configuration shown in FIG. 4, the resilient member 324 is generally aligned with the gap 410, e.g., along a line 412. In this position, the resilient member 324 may be better positioned to absorb the forces at the first region 402 and the second region 404. However, the actuated pin assembly 200 is not limited to the resilient member 324 being aligned with the gap 410. Without limitation, in other examples, the resilient member 324 may be offset from the line 412 and still function to absorb the displacement at the first region 402 and/or the second region 404 and allow the pin body 206 to bear the loads without transferring the loads to the piston rod 216.

Figure 5:
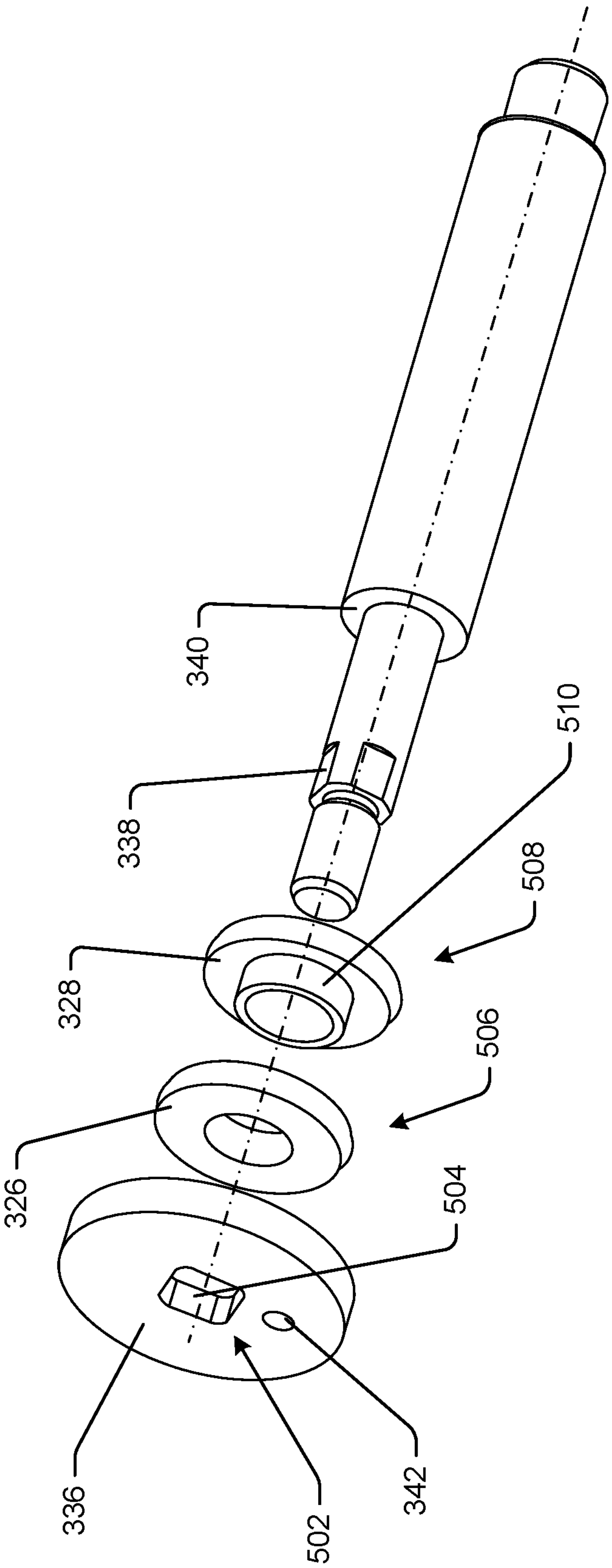
FIG. 5 is an exploded perspective view of aspects of the actuated pin assembly of FIGS. 2A and 2B, in accordance with aspects of this disclosure.

FIG. 5 is an exploded perspective view of portions of the pin assembly 200. Specifically, FIG. 5 shows additional details of the piston rod 216, the resilient member 324, and the disc 336. For clarity, some components shown in FIGS. 3 and/or 4 are omitted from FIG. 5, including but not limited to the washers 332 and the sleeve 334.

In detail, FIG. 5 shows the flats 338 as including four planar surfaces arranged at 90-degree intervals around a segment of the piston rod 216. The disc 336 includes an axial opening 502 having four corresponding planar sections 504. Accordingly, and as discussed above, the flats 338 and the planar sections 504 act as an anti-rotation feature. Accordingly, when the nut (not shown in FIG. 5) is threaded onto the piston rod 216, the disc 336 will not rotate relative to the piston rod 216. As noted above, modifications to the illustrated arrangement are contemplated.

FIG. 5 also shows that the resilient member 324 can be formed of two pieces, e.g., a first piece 506 including the first radial protrusion 326 and a second piece 508 including the second radial protrusion 328. In this example, the second piece 308 also includes a protrusion 510 that contacts the first piece 506 to define the channel 330 discussed above.

Figure 6:
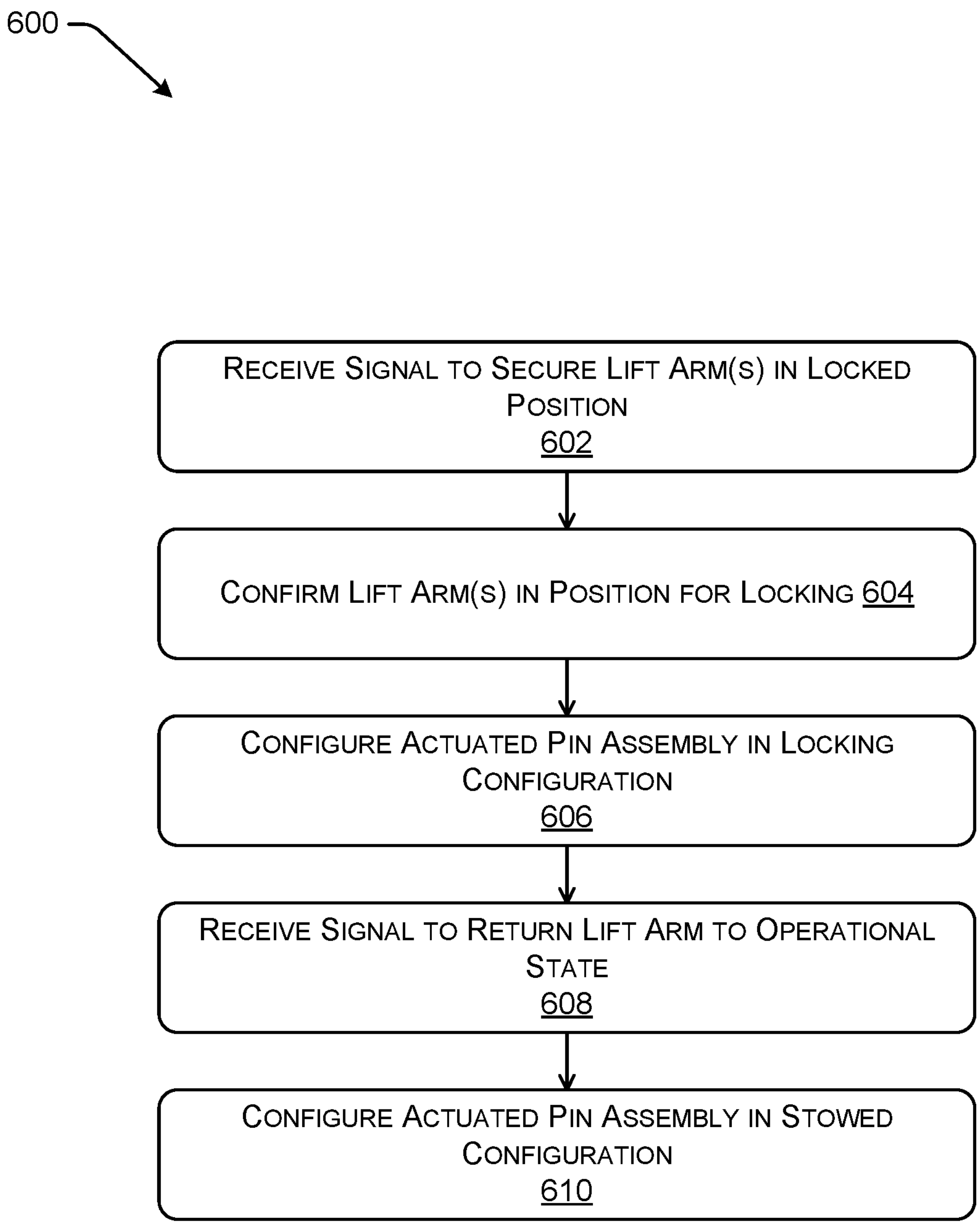
FIG. 6 is a flow chart representative of a process for controlling an industrial machine including an actuated pin assembly, in accordance with aspects of this disclosure.

FIG. 6 is a flow chart corresponding to an example process 600 of using an actuated pin assembly, like the actuated pin assemblies 114, 200 discussed above. For example, and without limitation, some or all of the process 600 can be implemented by the actuated pin control system 134, including the sensor(s) 136, the actuator(s) 138, and/or the controller(s) 140. However, the process 600 is not limited to being performed by the actuated pin control system 134 or components thereof.

At an operation 602, the process 600 includes receiving a signal to secure one or more lift arms in a locked position. For example, an operator or maintenance worker may determine that a machine including the lift arms 104 should be repaired, inspected, or the like, and may enter a command, e.g., via a switch, button or other user input, indicating that the lift arms 104 should be "locked out." The user interface may generate a signal corresponding to the command, and transmit the signal to the controller(s) 140 in some examples.

At an operation 604, the process 600 includes confirming that the lift arm(s) are in a position for locking. As detailed herein, the lift arms 104 may be locked, e.g., secured relative to the frame 102 in a raised position. The operation 604 may include receiving a signal confirming that the lift arms 104 are at (or above) the raised position. For example, the operation 604 can include receiving a signal, e.g., from the sensor(s) 136 or the actuator(s) 138 confirming that the lift arms 104 are raised above a predetermined height, past a predetermined angle, or the like. The sensor(s) 136 can also include presence/absence sensors, which may confirm that the frame 102 would not obstruct actuation of the pin assembly to the locking configuration, as detailed herein. In still further examples, the operation 604 may include a visual inspection, e.g., by an operator or maintenance worker, that the lift arms 104 are raised above a predetermined height. In this example, the operator/worker may be required to provide an input, e.g., via a user interface, confirming that the lift arms 104 are sufficiently positioned.

At an operation 606, the process 600 includes configuring the actuated pin assembly in the locking configuration. Specifically, the actuator 302 of the actuated pin assembly 200 may be actuated to position the piston/piston rod in the extended position shown in FIG. 4. In the extended position, the pin body 206 is disposed in the relative path of the travel between the frame 102 and the lift arms 104. An example of the locking configuration is also illustrated at 204 in FIG. 2B. As will be appreciated, with the actuated pin assembly 200 in the locking configuration, lowering of the lift arms 104 is inhibited by the extended pin body 206, thereby "locking out" the lift arms 104. With the lift arms 104 locked out, repair, maintenance, and/or other services can be performed on the lift arm assembly 100 and/or other parts of the machine, with the lift arms 104 safely locked out. In other examples, the lift arms 104 may be locked out using the actuated pin assembly 200 when the machine is to be unattended.

In some examples, the operation 606 can also include confirming that the actuated pin assembly is in the locking configuration. Without limitation, the actuator 302 may include a sensor, e.g., a position sensor, that confirms that the piston rod 216 is in the extended position. Moreover, one or more sensor(s), such as a presence sensor or state sensor and which may be the sensor(s) 136, may be disposed on the lift arm 104 and/or the frame 102 to confirm that the pin body 206 is in an extended position, corresponding to the locking configuration 204.

At an operation 608, the process 600 includes receiving a signal to return the lift arm to an operational state. For example, the operation 608 can include receiving a user input, e.g., from an operator or maintenance worker, that the machine should return to normal operation. The machine may include a user interface to facilitate such user input, and the user interface may be configured to generate a signal indicative of the desire to return the machine to functional.

At an operation 610, the process 600 includes configuring the actuated pin assembly in a stowed configuration. For example, the operation 610 can include actuating the actuator 302 to retract the piston rod 216, as in the example of FIG. 3. FIG. 2A also shows the actuated pin assembly 200 in the stowed configuration 202. As detailed herein, in the stowed configuration, the pin body 206 is disposed in the opening 132 formed through the lift arm 104 or some other position that does not inhibit relative movement of the lift arm 104 and the frame 102.

In some examples, the operation 610 can also include confirming that the actuated pin assembly 200 is in the stowed configuration. Without limitation, the actuator 302 may include a sensor, e.g., a position sensor, that confirms that the piston rod 216 is in the retracted position. Moreover, one or more sensor(s), such as a presence sensor or state sensor and which may be the sensor(s) 136, may be disposed on the lift arm 104 and/or the frame 102 to confirm that the pin body 206 is in the retracted position, corresponding to the stowed configuration 202.

INDUSTRIAL APPLICABILITY

The present disclosure provides improved safety mechanisms, e.g., actuated pin assemblies, for use with conventional machines, such as industrial machines including lift arm assemblies. The actuated pin assemblies according to this disclosure provide improved safety over conventional lockout pins, resulting in reduced damage to equipment and/or safer working conditions, thereby reducing downtime for machines. The improvements and techniques described herein may be particularly useful on machines that are operated in confined spaces and/or that require frequent maintenance. For example, wheel loaders and/or other machines used in mines may require regular inspection, e.g., daily, weekly, or the like, and it may be difficult and/or inefficient to provide external machinery and/or equipment, such as cranes, to lockout portion of the machine. The present disclosure obviates the need for extra equipment to allow for safely securing portion of machine during inspection or the like. Moreover, despite the improvements detailed herein, the pin assemblies described herein may be used in conventional machines, e.g., with minimal to no modification to existing lift arm assemblies.

According to some implementations, a lift arm assembly 100 includes a lift arm 104 disposed to move relative to a frame 102. An actuated pin assembly 114, 200 is disposed on the lift arm 104 or the frame 102. The actuated pin assembly 114, 200 is actuatable between a stowed configuration 202 and a locking configuration 204. In the stowed configuration 202, the actuator pin assembly 114, 200 is disposed out of a travel path of the lift arms 104 relative to the frame 102, e.g., to allow for conventional operation of the lift arm assembly 100. In the locking configuration 204, a portion of the actuated pin assembly 114, 200, e.g., a pin body 206, is disposed in the travel path of the lift arms 104 relative to the frame 102, e.g., to prevent relative motion between the lift arms 104 and the frame. Actuation of the actuated pin assembly 114, 120 between the stowed configuration 202 and the locking configuration 204 may be accomplished remotely, e.g., via the actuated pin control system 134, thereby obviating the need for a worker to manually adjust or place the shear pin.

In examples described herein, the actuated pin assembly 114, 200 includes the pin body 206 coupled to an actuator 302. In examples, the actuator 302 may be a hydraulic actuator, e.g., including a cylinder 208 and a piston rod 216 movable relative to the cylinder 208, between a retracted position and an extended position. The pin body 206 is coupled to the piston rod 216 such that the actuated pin assembly 114, 200 is in the stowed configuration 202 with the piston rod 216 retracted and in the locking configuration 204 with the piston rod 216 extended. The coupling of the pin body 206 to the piston rod 216 can be made via the resilient member 324. The resilient member 324 allows for some movement of the pin body 206 relative to the piston rod 216, e.g., to absorb relative displacement of the pin body 206 to the frame 102 and/or the lift arm 104.

While aspects of the present disclosure have been particularly shown and described with reference to the examples above, it will be understood by those skilled in the art that various additional implementations may be contemplated by the modification of the disclosed machines, systems and methods without departing from the spirit and scope of what is disclosed. Such implementations should be understood to fall within the scope of the present disclosure as determined based upon the claims and any equivalents thereof

What is claimed is:

1. A machine comprising:

a frame;

a lift arm coupled to the frame and movable relative to the frame; and an actuated pin assembly actuatable between a stowed configuration and a locking configuration, the actuated pin assembly comprising:

a stationary member;

a movable member coupled to and movable relative to the stationary member; and a pin body coupled to the movable member and movable with the movable member relative to the stationary member, the pin body including (i) an interior surface at least partially defining an axial bore that, with the actuated pin assembly in the stowed configuration, surrounds at least a portion of the stationary member and (ii) an exterior surface that, with the actuated pin assembly in the locking configuration, contacts at least one of the lift arm or the frame to inhibit movement of the lift arm relative to the frame.

2. The machine of claim 1, wherein the movable member is movable relative to the stationary member between a retracted position, corresponding to the stowed configuration of the actuated pin assembly, and an extended position, corresponding to the locking configuration of the actuated pin assembly.

3. The machine of claim 1, wherein the actuated pin assembly further comprises a resilient member disposed proximate a distal end of the movable member, the resilient member at least partially disposed in the axial bore to contact the interior surface of the pin body.

4. The machine of claim 3, wherein the resilient member is disposed at a position along an axial length of the movable member such that, with the actuated pin assembly in the locking configuration, at least a portion of the resilient member is aligned between a first radial force applied by the frame to the exterior surface of the pin body and a second radial force applied by the lift arm to the exterior surface of the pin body.

5. The machine of claim 3, wherein the resilient member comprises a first radial protrusion and a second radial protrusion spaced from the first radial protrusion along an axial length of the movable member.

6. The machine of claim 5, wherein the pin body comprises an annular protrusion extending from the interior surface, at least a portion of the annular protrusion being disposed, in an axial direction, between the first radial protrusion of the resilient member and the second radial protrusion of the elastomeric member.

7. The machine of claim 3, wherein the actuated pin assembly further includes:

a retaining fastener; and a disc disposed between the retaining fastener and the resilient member, wherein the retaining fastener biases the disc in the axial direction, to selectively compress the resilient member.

8. The machine of claim 7, wherein the disc comprises a first anti-rotation feature that cooperates with a second anti-rotation feature on the movable member to prevent a rotation of the disc relative to the movable member.

9. The machine of claim 8, wherein the retaining fastener comprises a threaded nut and the disc further comprises one or more tool interfaces configured to cooperate with a tool to prevent rotation of the disc during tightening of the threaded nut on the movable member.

10. The machine of claim 7, wherein the disc, the retaining fastener, and the movable member are radially spaced from the interior surface of the pin body, such that only the resilient member contacts the interior surface of the pin body.

11. The machine of claim 1, further comprising:

one or more sensors positioned to detect at least one of a presence of the actuated pin assembly in the stowed configuration or a presence of the actuated pin assembly in the locking configuration.

12. An actuated pin assembly comprising:

an actuator comprising a movable member and a fixed member, the movable member being movable relative to the fixed member between a retracted position and an extended position; and a pin body coupled to the movable member to move with the movable member relative to the fixed member, the pin body including an interior surface at least partially defining an axial bore that, with the actuator in the retracted position, at least partially surrounds the fixed member of the actuator.

13. The actuated pin assembly of claim 12, further comprising:

a resilient member coupled to the movable member and contacting the interior surface of the pin body.

14. The actuated pin assembly of claim 13, wherein the resilient member comprises at least one of a polymeric member or a spring.

15. The actuated pin assembly of claim 13, wherein:

the resilient member comprises a first radial protrusion and a second radial protrusion spaced from the first radial protrusion along an axial length of the movable member;

the pin body comprises an annular protrusion extending from the interior surface, and at least a portion of the annular protrusion is disposed, in an axial direction, between the first radial protrusion of the resilient member and the second radial protrusion of the resilient member.

16. The actuated pin assembly of claim 15, further comprising:

a retaining fastener; and a disc disposed between the retaining fastener and the resilient member, the retaining fastener selectively biasing the disc in the axial direction to compress the resilient member in the axial direction.

17. The actuated pin assembly of claim 16, wherein the disc comprises a first anti-rotation feature that cooperates with a second anti-rotation feature on the movable member to prevent a rotation of the disc relative to the movable member.

18. An actuated pin assembly comprising:

an actuator comprising a movable member and a fixed member, the movable member being movable relative to the fixed member between a retracted position and an extended position;

a pin body coupled to the movable member to move with the movable member relative to the fixed member, the pin body including an interior surface at least partially defining an axial bore; and a resilient member coupled to the movable member and contacting the interior surface of the pin body.

19. The actuated pin assembly of claim 18, wherein:

the resilient member comprises a first radial protrusion and a second radial protrusion spaced from the first radial protrusion along an axial length of the movable member;

the pin body comprises an annular protrusion extending from the interior surface; and at least a portion of the annular protrusion being disposed, in an axial direction, between the first radial protrusion of the resilient member and the second radial protrusion.

20. The actuated pin assembly of claim 18, wherein, with the actuator in the retracted position, the fixed member is disposed at least partially in the axial bore of the pin body.

* * * * *